(12) United States Patent
Lee et al.

(10) Patent No.: US 6,880,392 B2
(45) Date of Patent: Apr. 19, 2005

(54) METHOD AND APPARATUS FOR DETERMINING AN APPROXIMATION FOR FUEL VOLATILITY ON-BOARD A VEHICLE

(75) Inventors: Han-Sheng Lee, Bloomfield Hills, MI (US); David K. Lambert, Sterling Heights, MI (US); Charles Robert Harrington, Troy, MI (US); Rick Daniel Kerr, Fenton, MI (US)

(73) Assignee: Delphi Technologies, Inc., Troy, MI (US)

( * ) Notice: Subject to any disclaimer, the term of this patent is extended or adjusted under 35 U.S.C. 154(b) by 186 days.

(21) Appl. No.: 10/150,675

(22) Filed: May 17, 2002

(65) Prior Publication Data

US 2003/0213293 A1 Nov. 20, 2003

(51) Int. Cl.$^7$ .............................................. G01M 19/00
(52) U.S. Cl. ...................................................... 73/118.1
(58) Field of Search .............................. 73/118.1, 116, 73/61.45, 61.49, 35.02, 53.05, 117.2, 117.3, 119 A; 123/435, 520, 491

(56) References Cited

U.S. PATENT DOCUMENTS

| | | | | |
|---|---|---|---|---|
| 5,244,809 A | * | 9/1993 | Nowak | 436/56 |
| 5,419,296 A | * | 5/1995 | Yamaura | 123/435 |
| 5,878,727 A | * | 3/1999 | Huls | 123/520 |
| 6,360,726 B1 | * | 3/2002 | Javaherian | 123/491 |
| 6,564,624 B2 | * | 5/2003 | Lin et al. | 73/118.1 |

\* cited by examiner

Primary Examiner—Edward Lefkowitz
Assistant Examiner—Octavia Davis
(74) Attorney, Agent, or Firm—Patrick M. Griffin

(57) ABSTRACT

An apparatus and method for determining an approximation to a measure of the volatility of fuel on-board a vehicle having an internal combustion engine. The method includes the steps of measuring at least one characteristic of the fuel corresponding to a temperature of the fuel, a volume of the fuel, and a concentration of oxygenates within the fuel; determining an approximation of the a measure of the volatility of the sample volume of fuel using a linear function based on the at least one measured characteristic of the fuel corresponding to temperature, volume, and concentration of oxygenates of the fuel. Preferably, at least one temperature measurement is associated with a predetermined volume of the sample as the sample is evaluated. The method can include determining whether a fuel contains ethanol, and if not, whether the fuel is a winter blend of fuel or a summer blend of fuel. The method to determine whether ethanol is present can include the steps of bringing the fuel into contact with a sensing element; measuring a characteristic of the fuel corresponding to concentration of oxygenates, such as the change in capacitance or resistance of the sensing element; and calculating the dielectric constant or the conductivity of the sample respectively. The method to determine the type of non-ethanol containing fuel can be based on two temperature measurements taken at two predetermined volumes during the evaporation process.

43 Claims, 6 Drawing Sheets

METHOD AND APPARATUS FOR DETERMINING AN APPROXIMATION FOR FUEL VOLATILITY ON-BOARD A VEHICLE

TECHNICAL FIELD

This invention relates to a method and apparatus for determining an approximation for the volatility of fuel on-board a vehicle for use in engine control.

BACKGROUND OF THE INVENTION

It is known in the art relating to automotive engines, that a key gasoline characteristic for good driveability is volatility. Volatility is especially important at the time an engine is started because liquid gasoline must evaporate and mix with air to form a combustible mixture. If too little gasoline is added, the engine will not start; if gasoline beyond that needed to initiate combustion is added, then extra hydrocarbons from an unburned portion of gasoline are found in the exhaust. Moreover, because gasoline sold in the United States varies in volatility, there is a tradeoff in engine design between low hydrocarbon emissions and good driveability with low volatility fuel.

To describe the effect of gasoline volatility on the cold start and warmup driveability of a vehicle, a driveability index (DI) has been developed. DI is a measure of volatility that was developed to help predict how different volatility gasolines affect engine performance and is correlated to how often an engine might stall, stumble, surge or hesitate. Other measures of volatility are also used. For gasoline that does not contain oxygenates, such as ethanol or methyl tertiary-butyl ether (MTBE), the definition of DI is based on a laboratory test (American Society for Testing and Materials D 86) in which a sample of gasoline is distilled as the temperature of the sample is raised. The fraction distilled is measured as a function of temperature and $$DI = 1.5T_{10} + 3T_{50} + T_{90} \qquad (1)$$

where $T_x$ is the temperature in degrees Fahrenheit at which x % of the gasoline sample has been distilled.

Since DI was developed for use with non-oxygenated fuels, a modified equation is needed to account for the addition of oxygenates into the fuel. For example, with 10% ethanol (by volume) added to oxygenate-free gasoline, an expression that provides better correlation to engine performance is:

$$DI = 1.5T_{10} + 3T_{50} + T_{90} + 86 \qquad (2)$$

Another popular oxygenated compound additive in fuel is MTBE (methyl tertiary butyl ether). To account for the addition of 15% MTBE (by volume) in oxygenate-free gasoline, a constant of 43.2 is added to the right-hand side of Equation (1).

With the knowledge of the fuel driveability index value, proper amounts of fuel can be dispensed to the engine, which can produce smoother engine starts and reduce emissions from the engine during the start up cycle. However, it is not particularly practical to use the actual ASTM D 86 apparatus to perform a DI measurement on-board a vehicle.

SUMMARY OF THE INVENTION

The present invention provides a method and apparatus for determining an approximation of the volatility of fuel on-board a vehicle to control engine operation based on measured characteristics of a sample volume of the fuel before and/or during a distillation or evaporation process. According to the present invention, at least one temperature $T_X$ of a sample volume of fuel is measured when the sample has been X percent evaporated, where X is a percentage between 0% and 90% inclusive. The measured temperature $T_X$ is used to determine an approximation of the volatility of the fuel according to the present invention. According to the present invention, the approximation of the volatility can take into account the measured initial temperature $T_0$ of the sample volume of fuel, where the initial temperature $T_0$ is measured before the sample is heated corresponding to the sample being 0% evaporated. By way of example and not limitation, the approximation of the volatility can be based on the measured temperature of the fuel sample when 50% of the initial sample volume has evaporated, or it can be based on the measured initial temperature $T_0$ in combination with another measured temperature when a predetermined percentage X of the sample has evaporated where X is greater than 0%. In the preferred configuration, the present invention is based on the measured initial temperature $T_0$ and on a measurement performed when a predetermined fraction of the sample volume of fuel has evaporated. In one embodiment this measurement is the sample temperature. In a second embodiment, this measurement is the elapsed time since heating of the sample began.

According to the method and apparatus of the present invention, the equation used to calculate the metric of volatility is different for fuel formulations that contain ethanol than for fuel formulations that do not contain oxygenate. Therefore, a preliminary determination is desirable to determine whether the fuel on-board the vehicle contains ethanol (unless, of course, ethanol content is already known). If no ethanol is contained in the fuel, then the fuel can be further identified as either a winter fuel blend or a summer fuel blend. With the combined knowledge of ethanol content and either winter or summer fuel formulation, different equations can be used to calculate the approximation of the value for DI, where each equation is based on at least one temperature measurements according to the present invention. According to the method and apparatus of the present invention, the approximation of DI for fuel formulations can be calculated as a linear function with respect to $T_X$ where $T_X$ is the estimated temperature at which X% of a sample of the fuel would have been distilled in the ASTM D 86 laboratory test. By way of example and not limitation, the approximation of DI for fuel formulations with ethanol, all seasons, can be calculated as $DI = 3.78T_{50} + 445$; without ethanol, for winter fuel blends, can be calculated as $DI = 3.26T_{50} + 431$; and without ethanol, for summer fuel blends, can be calculated as $DI = 3.51T_{50} + 421$. Using the above equations, the standard deviation of the difference between the approximation of DI and the ASTM "measured" DI is approximately 20 units from the '98 and '99 AMA collected fuel samples.

Alternatively, an algorithm has been developed to approximate the driveability index (DI) value of fuel according to the present invention. It was found that the value of DI could be expressed by a linear equation with $T_{50}$ as the variable, where $T_{50}$ is the temperature at which 50% (in volume) of fuel would have been distilled in accordance with a standard fuel distillation measurement, as described in the ASTM D 86 method. A pre-determined empirical correlation is used to relate the fraction of a fuel sample evaporated by an on-board sensor as a function of temperature as the temperature is raised, to the temperature $T_{50}$ that would have been measured for the same fuel by the ASTM D 86 method. The same approach is used to determine the temperature $T_{10}$ of the on-board fuel. To better correlate the value of driveability index with $T_{50}$, it is desirable to separate the fuel into one of the three categories; ethanol containing fuels, summer blended fuels and winter blended fuels. Summer or winter blends of fuel are not determined by the season of the year. The blend designation is associated with the volatility of the fuel at low temperatures and is determined by the ratio of the two temperatures $((T_{50}-T_{10})/T_{50})$, where $T_{10}$ is the temperature at which 10% of fuel has been distilled in accordance with the ASTM D 86 method, and $T_{50}$ is the temperature at which 50% of fuel has been distilled in accordance with the ASTM D 86 method. After examining the AMA analyzed fuel samples which were collected in North America from 1996 to 2000, the following equations can be used to approximate the driveability index of fuel:

for fuels with ethanol:

$$DI = 3.72\ T_{50} + 370 + 8.62 C_{Ethanol} \quad (3)$$

for summer blend fuels:

$$DI = (4.1\ T_{50} + 299) - 20\ \eta(178.3 - T_{50}) \quad (4)$$

for winter blend fuels:

$$DI = (3.51\ T_{50} + 386) + 30\ \eta(T_{50} - 234.76) \quad (5)$$

where $C_{Ethanol}$ is the ethanol volume concentration in percent (%), and $\eta(x)$ is a unit step function. The function $\eta(x)$ equals zero when x is negative, and equals one, otherwise. For non-ethanol containing fuels, the value, $(T_{50}-T_{10})/T_{50}$, is used to separate the summer blend and winter blend types of fuel. If the value is larger than 0.425, the fuel is considered to be a winter blend of fuel in the computation. Otherwise, the fuel is considered to be a summer blend of fuel. An even better fit to DI can be based on both $T_{10}$ and $T_{50}$, without describing the fuel as either a winter blend of fuel or as a summer blend of fuel. For example, an equation that can be used is:

$$DI = 334.36 + 1.92509\ T_{10} + 2.78259\ T_{50} + 57.01226\ \eta(C_{Ethanol} - 5\%). \quad (6)$$

Also according to the invention, the determination of the oxygenate concentration, or for example, whether a fuel contains approximately 10% ethanol can be based on input received from a sensing element brought into contact with the fuel or a sample of the fuel. That is, the measured changes in capacitance or resistance of the sensing element over time determines whether the fuel contains approximately 10% ethanol. The dielectric constant of pure ethanol at 25° C. is 24.3, more than 10 times larger than the value of 2.1 for pure hydrocarbon fuel. The dielectric constant of gasoline that contains approximately 10% ethanol is greater than 3. Similarly, the conductivity of gasoline that contains ethanol is several orders of magnitude larger than that of pure hydrocarbon fuel In particular, to detect the presence of ethanol, a threshold value of 1000 picoSiemens per meter (pS/m) can be used. The approximation value of fuel volatility can be stored for use during the next cold start cycle of the internal combustion engine to adjust control of the air/fuel ratio based on the approximation value of fuel volatility. The control system according to the present invention can use software, hardware, or a combination of the two to use the approximation value of fuel volatility to adjust control of the engine operation.

These and other features and advantages of the invention will be more fully understood from the following description of certain specific embodiments of the invention taken together with the accompanying drawings.

DESCRIPTION OF THE PREFERRED EMBODIMENT

Figure 1:
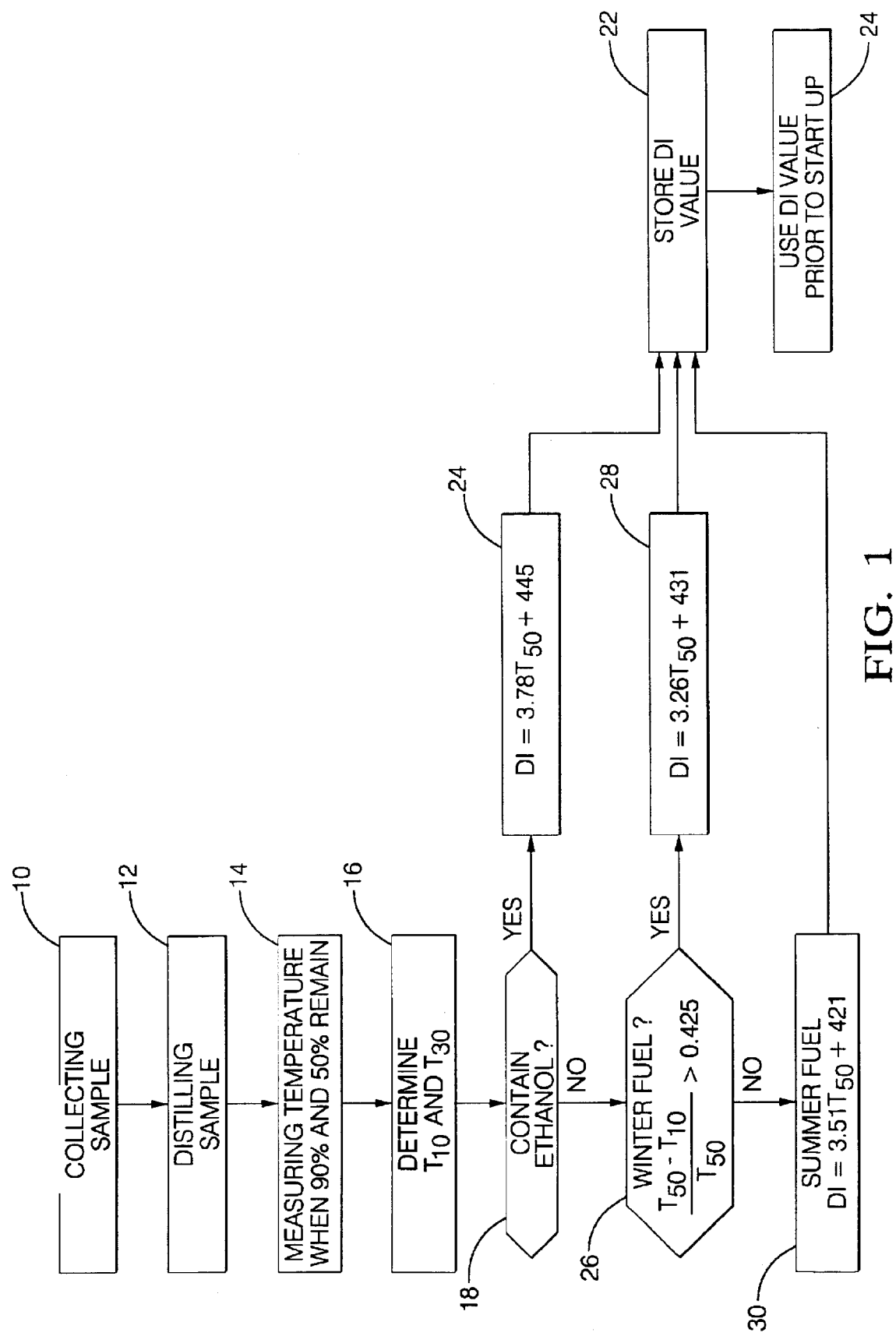
FIG. 1 is a schematic flow diagram of a control system according to the present invention used to determine a measure of fuel volatility, such as the driveability index, of a fuel of unknown ethanol content which is then used to control engine operation.

Referring now to the drawings in detail, the determination of a measure of fuel volatility, such as the driveability index, for fuel begins in Step 10 by collecting a sample of fuel. In Step 12, the sample is evaporated to a predetermined volume defined as a percentage X (%) of the initial sample volume of fuel. When the sample reaches a predetermined volume, a characteristic of the fuel corresponding to temperature is measured in Step 14. Temperature measurements can be taken continuously during the evaporation procedure, or can be taken intermittently throughout evaporation of the sample, or can be taken at one or more discrete predetermined volumes of the sample. Preferably, the temperature measurement is taken at least before heat is supplied to the sample, corresponding to the initial temperature $T_0$, and when the sample is approximately 10% and 50% evaporated. In Step 16, a previously determined empirical correlation is used to estimate from the quantity measured by the sensor, the values of $T_{10}$ and $T_{50}$ that would have been determined for the fuel in the ASTM D 86 laboratory test. In Step 18, a determination is made as to whether the fuel sample contains ethanol. If the fuel contains ethanol, then, the approximation value for DI is calculated in Step 20 as being equal to a linear function with respect to the measured characteristic of the fuel corresponding to temperature. By way of example and not limitation, the approximation value for $DI = 3.78 T_{50} + 445$, where $T_{50}$ is the temperature in degrees Fahrenheit (° F.) when approximately 50% of the initial sample volume has been evaporated. It should be understood that if the fuel is known to contain ethanol, then only one temperature measurement is required in Step 14, and the approximation value of DI can be calculated in Step 20 accordingly. In Step 22, the approximation value of DI is stored in memory and in Step 24, the stored approximation value of DI is used to calibrate or adjust the amount of fuel delivered or the air/fuel ratio for an internal combustion engine of a vehicle prior to a subsequent start up.

Returning to Step 18, if the fuel does not contain ethanol, then a determination is made in Step 26 whether the fuel is a summer blend or a winter blend of fuel. This determination can be accomplished by using the temperature measurements of Step 14, when 10% and 50% of the sample volume has been evaporated ($T_{10}$ and $T_{50}$ respectively). If (($T_{50}$-$T_{10}$)/$T_{50}$)>0.425, then the fuel is identified as a winter blend of fuel, otherwise the fuel is identified as a summer blend of fuel. The approximation value of DI is calculated in Step 28 as a linear function with respect to the measured characteristic of the fuel corresponding to temperature for a winter blend of fuel. By way of example and not limitation, the approximation value of DI is calculated as being equal to DI=3.26$T_{50}$+431, where $T_{50}$ is the temperature in degrees Fahrenheit (° F.) at which 50% of the initial sample volume would have been distilled for the ASTM D 86 test. The control system then returns to Steps 22 and 24, where the approximation value of DI is stored and then used to calibrate the delivery of fuel to the internal combustion engine during a subsequent start up. Returning to step 26, if the fuel is identified as a summer blend of fuel, as a result of (($T_{50}$-$T_{10}$)/$T_{50}$) not being greater than 0.425, then the approximation value of DI is calculated as a linear function with respect to the measured characteristic of fuel corresponding to temperature in Step 30. By way of example and not limitation, the approximation value of DI can be calculated as being equal to DI=3.51 $T_{50}$+421, where $T_{50}$ is the temperature in degrees Fahrenheit (° F.) at which 50% of the initial sample volume would have been distilled for the ASTM D 86 test. Thereafter, Steps 22 and 24 are performed as previously described. Each of the approximation values of DI calculated according to the disclosed method are within ±5% of the actual DI values for the particular fuels (when tested pursuant to the ASTM D 86 standard) without requiring more complicated, time consuming methods that are undesirable for repetitive testing on-board a vehicle. Moreover, the estimated values provided by the present invention provide sufficient accuracy to accommodate effective control of the air/fuel mixture or fuel delivery to the internal combustion engine to be controlled.

Figure 2:
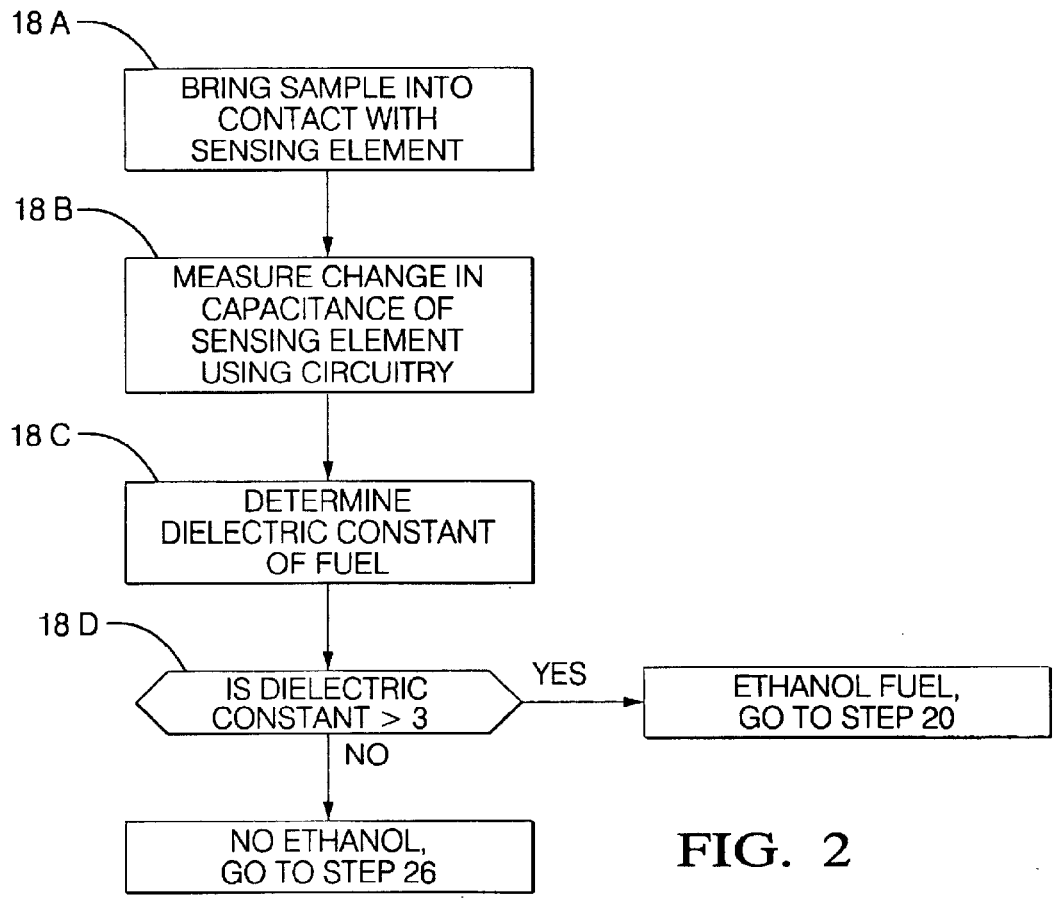
FIG. 2 is a schematic flow diagram of a control system according to the present invention for determining if the fuel sample contains ethanol.

A further aspect of the method of FIG. 1 is set forth in the block diagram of FIG. 2. FIG. 2 illustrates a preferred method of determining whether a fuel sample contains ethanol. In this routine of the control system, the fuel or a sample volume of the fuel is brought into contact with a sensing element of known geometry in Step 18A. In step 18B, a circuit operably connected to the sensing element measures a characteristic of the fuel corresponding to a concentration of oxygenates within the fuel. By way of example and not limitation, the circuit can measure the change in capacitance of the sensing element over time as the sample volume of fuel is being evaporated. In Step 18C, the dielectric constant of the sample volume of fuel is determined using the ratio of the output of the capacitance measuring circuit for the values measured with sample and with air in contact with the sensing element. Query Step 18D determines if the dielectric constant is greater than 3. If the answer to query Step 18D is yes, then the fuel contains ethanol and the control system continues on to Step 20, as shown in FIG. 1. If the dielectric constant is less than 3, and therefore the answer to query Step 18D is no, then the control system proceeds to Step 26 to determine whether the fuel is a winter blend or a summer blend of fuel. Alternatively, by way of example and not limitation, in Step 18C, the measured characteristic corresponding to the concentration of oxygenates within the fuel can be a measurement of conductivity of the fuel or a sample volume of fuel. The conductivity of the fuel can be obtained as an output of the sensing element. Alternatively, since resistance is 90 degrees out of phase with capacitance, a circuit similar to that used to determine the capacitance of the fuel in Step 18B can be used to determine the conductivity of the fuel. If the conductivity is high (i.e. greater than 1000 picoSiemens per meter (pS/m)), then the fuel contains ethanol and the control system continues on to Step 20, as shown in FIG. 1. If the conductivity is low (i.e. less than 1000 picoSiemens per meter (pS/m)), then the control system branches to Step 26 to determine the season of the fuel.

Figure 3:
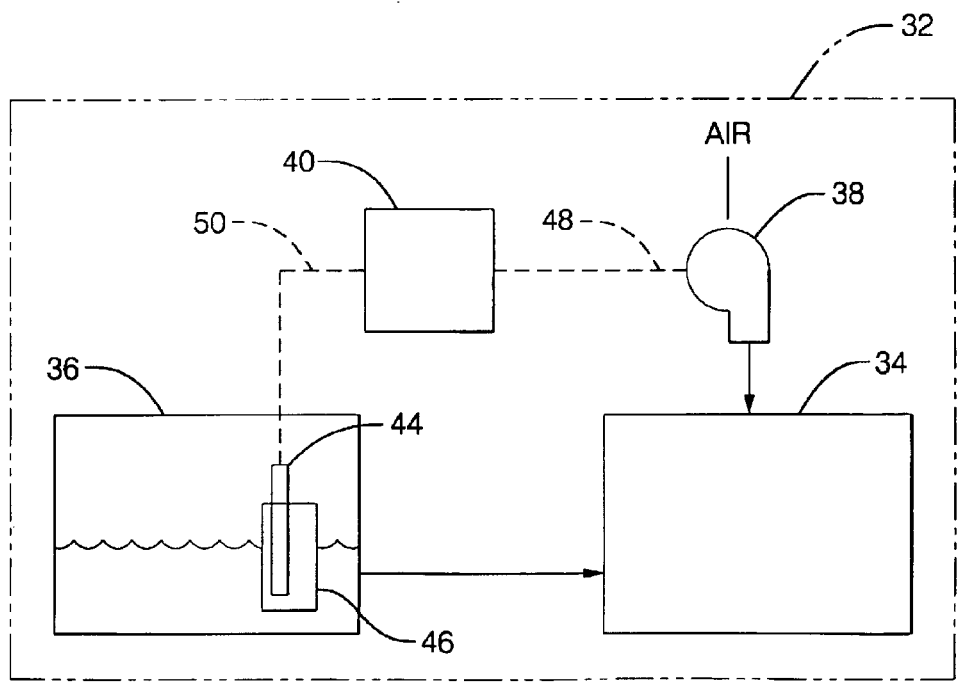
FIG. 3 is a schematic diagram of a vehicle equipped with an apparatus of the claimed invention.

FIG. 3 illustrates a control system of the present invention for a vehicle 32 shown in phantom line. The vehicle 32 includes an internal combustion engine 34, fuel tank 36, and fuel delivery or air/fuel mixture adjustment 38. The control system 40 according to the present invention receives at least one input signal 42 corresponding to temperature, conductivity, capacitance, and/or resistance. The at least one input signal is generated by at least one sensor 44 operably engagable with respect to a fuel sample receptacle 46. The at least one input signal is processed by the control system according to a program stored in memory as illustrated in FIGS. 1 and 2 for generating at least one output signal 48 for adjusting the air/fuel mixture or fuel delivery based on the previously measured results of the fuel sample.

EXAMPLE

The following description is a specific example of a procedure that has been used to determine driveability index (DI) from an on-vehicle sensor. The sensor element used for this example is of the interdigitated type as described below. The sensor was installed in the fuel tank of a Pontiac Grand Am. The method used to fill the sensor with fuel while the engine is running is described below. The sensor was mounted in the vapor space of the fuel tank and operates at the end of each trip.

If a measure of fuel volatility is determined according to the present invention, cold start enrichment can be limited without compromising startability and driveability. While the fuel pump is on, the sensor's fuel sample is continuously replenished. After the engine is turned off, the sample is evaporated to determine a measure of fuel volatility. The volatility value, determined by the sensor, which may be DI, is used in the engine's fueling algorithm for the next cold start.

The sensor according to the present invention allows engines to start reliably with fuels that vary in volatility. At present, without a Dl sensor, engines are calibrated to start with low-volatility fuel. Consequently, cold-start enrichment was almost always too high in the real world (and for emissions testing), causing excess exhaust hydrocarbon (HC) emissions during the cold start. With a Dl sensor, cold start enrichment was limited during a vehicle cold start without compromising startability/driveability. This decreases exhaust HC emissions. At the same time, the vehicle maintains startability even with less volatile fuel than would be otherwise tolerated. In addition, a decrease in cold start enrichment increases fuel economy and decreases exhaust CO emissions.

The exhaust HC increase caused by calibrating for low-volatility fuel (as opposed to the indoline used for certification) ranges from 6.7% to 68%. The average penalty was 29%. As exhaust HC emission standards are tightened, cold-start exhaust HC emissions have been found most difficult to control—sometimes over 50% of the total. Thus, in the future, a Dl sensor according to the present invention has the potential to reduce exhaust HC emissions by as much as 50%.

A Dl sensor can also decrease exhaust HC emissions with low volatility (high Dl) fuel. It does so by allowing the engine controller to provide enough enrichment to avoid misfires. High Dl fuel is correlated with excess exhaust HC emissions of unmodified vehicles. These excess HC emissions are caused by misfires that occur during open loop operation when the air/fuel ratio is too low. With a Dl sensor, the performance problems now seen with high Dl fuel during open-loop operation could be avoided. While this would not change FTP test results, it would increase customer satisfaction and would decrease real world exhaust HC emissions.

The Dl measurement was performed at the end of each trip. At a cold start, the previously measured value was used to control fuel enrichment. The Dl measurement does not need to be performed at the time of the start. If a vehicle is refueled while the engine is off, the next start usually occurs within a few minutes—it is not a cold start. Even if the vehicle were to be refueled and parked long enough for the next start to be considered a cold start, the fuel used to start the vehicle would be the fuel in the fuel line remaining from the previous trip.

Figure 4A:
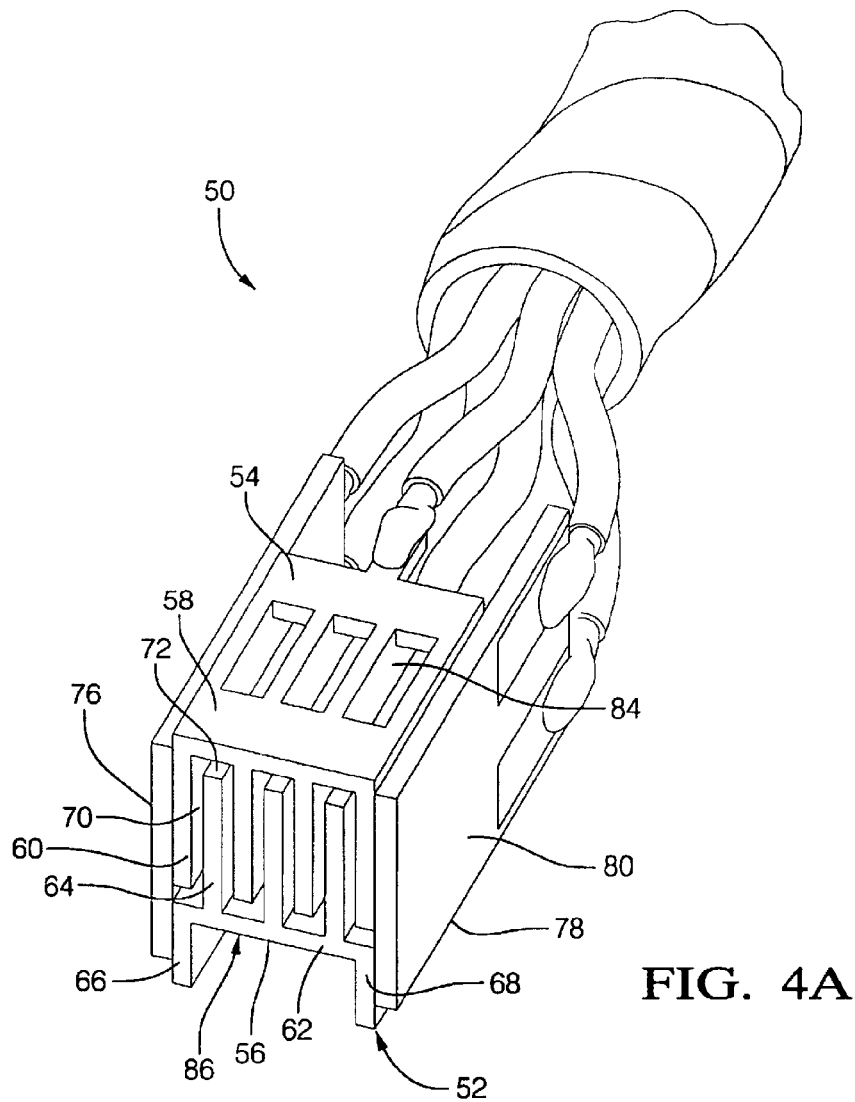
FIG. 4A is a perspective view of a interdigitated sensor positionable in fluid contact with a flow of fuel while the engine is running according to the present invention.
Figure 4B:
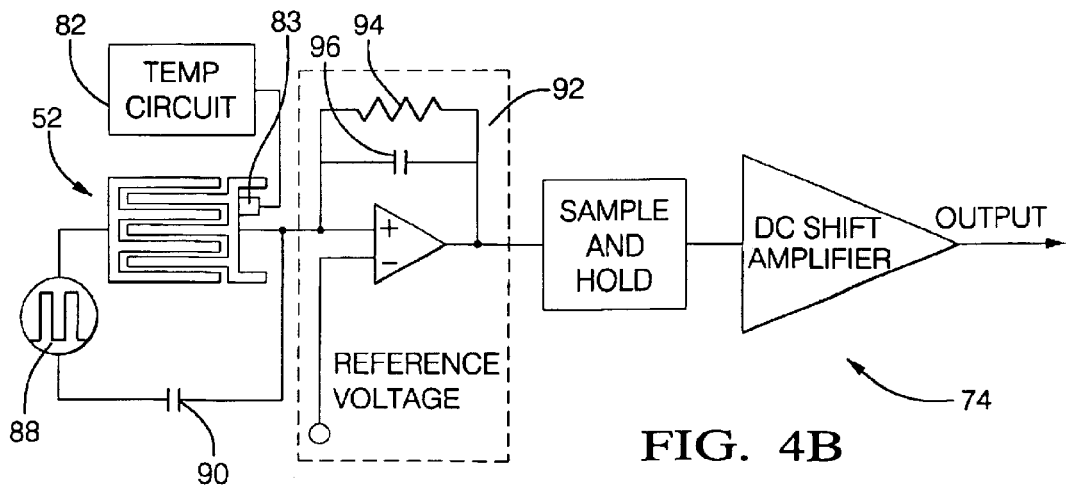
FIG. 4B is a schematic diagram of a signal processing circuit according to the present invention.

As shown in FIGS. 4A and 4B, the sensor 50 includes a sensing element 52 including a pair of interdigitated members 54 and 56. Member 54 has a base plate 58 with a plurality of parallel capacitor plates 60 mounted to the base 58 perpendicularly, and equally spaced from one another to form slots extending therebetween. The opposing member 56 includes a base plate 62 with a plurality of parallel capacitor plates 64 mounted to the base plate 62 perpendicularly, and equally spaced from one another to form slots extending therebetween. The base plate 62 of the member 56 further includes a pair of walls 66, 68 mounted on and perpendicular to plate 62 opposite from plates 64. The plates 64 of member 56 are interdigitated with plates 60 of member 54 leaving a gap 70 in the range of 0.2 millimeter (mm) to 0.8 millimeter (mm) between each alternating plate, and a gap 72 in the range of 0.2 millimeter (mm) to 0.8 millimeter (mm) between the free end of each one of the plates 60, 64 and the corresponding opposing base 58 and 62 respectively.

In operation, the sensing element 52 is mounted within the fuel tank of a vehicle in contact with a flow of fuel when the engine is running, while positioned above the maximum fuel level in the tank. When the vehicle engine is stopped, and the fuel drains away from the sensor, a known volume of fuel is retained between the plates 60, 64 by capillary action completely filling the gaps 70, 72. The sensing element 52 is connected to a capacitance measuring circuit 74 as illustrated in FIG. 4B through terminals integral with the base plates 58 and 62.

As shown in FIG. 4A, the sensing element 52 is mounted between a pair of ceramic plates 76 and 78. A heating element 80 is connected to one or both of the pair of ceramic plates 76 and 78. A temperature measuring circuit 82 is attached to a thermistor 83 adjacent the sensing element 52 to monitor the change in temperature of the sensing element 52 over time. As the sensing element 52 is heated, the fuel filling the gaps 70, 72 begins to evaporate. Base plate 58 further includes a plurality of openings 84 disposed between the parallel plates 60. Base plate 62 includes similar openings 86 disposed between parallel plates 64. Openings 84, 86 facilitate vapor release from the sensing element 52 during heating. Sensing element 52 is connected through terminals to the circuit 74 and receives an excitation signal in the form of a square wave having relatively high frequency in the range of 50 kiloHertz (kHz) to 100 kiloHertz (kHz). A signal generator 88 and sensing element 52 are connected in series with a balancing capacitor 90. In the preferred embodiment, the balancing capacitor 90 has a fixed capacitance close to the capacitance of an empty sensing element 52 in order to generate an input current to a current-to-voltage converter 92. The current-to-voltage converter 92 includes a resistor 94 having a relatively large resistance in the range of 1,000,000 ohms. The resistor 94 functions to discharge the capacitance of the sensing element 52. Resistor 94 is positioned in parallel with a feedback capacitor 96 having a relatively small capacitance in the 20 picofarad (pF) range. Current-to-voltage converter 92 produces an output voltage directly proportional to the input current and directly proportional to the impedance difference between the sensing element 52 and the balancing capacitor 90. Changes in the impedance difference are equal to the changes in capacitance of the sensing element 52 since the capacitance of the balancing capacitor 90 is fixed. The output of the current-to-voltage converter 92 is changed into a direct current signal as illustrated in FIG. 4B to obtain an output voltage directly proportional to the sample volume. Output from the circuit 74 and the temperature measurement circuit 82 is provided to a micro controller (not shown) programmed to perform measure of volatility calculations depending on the capacitance versus temperature relationships.

Figure 5:
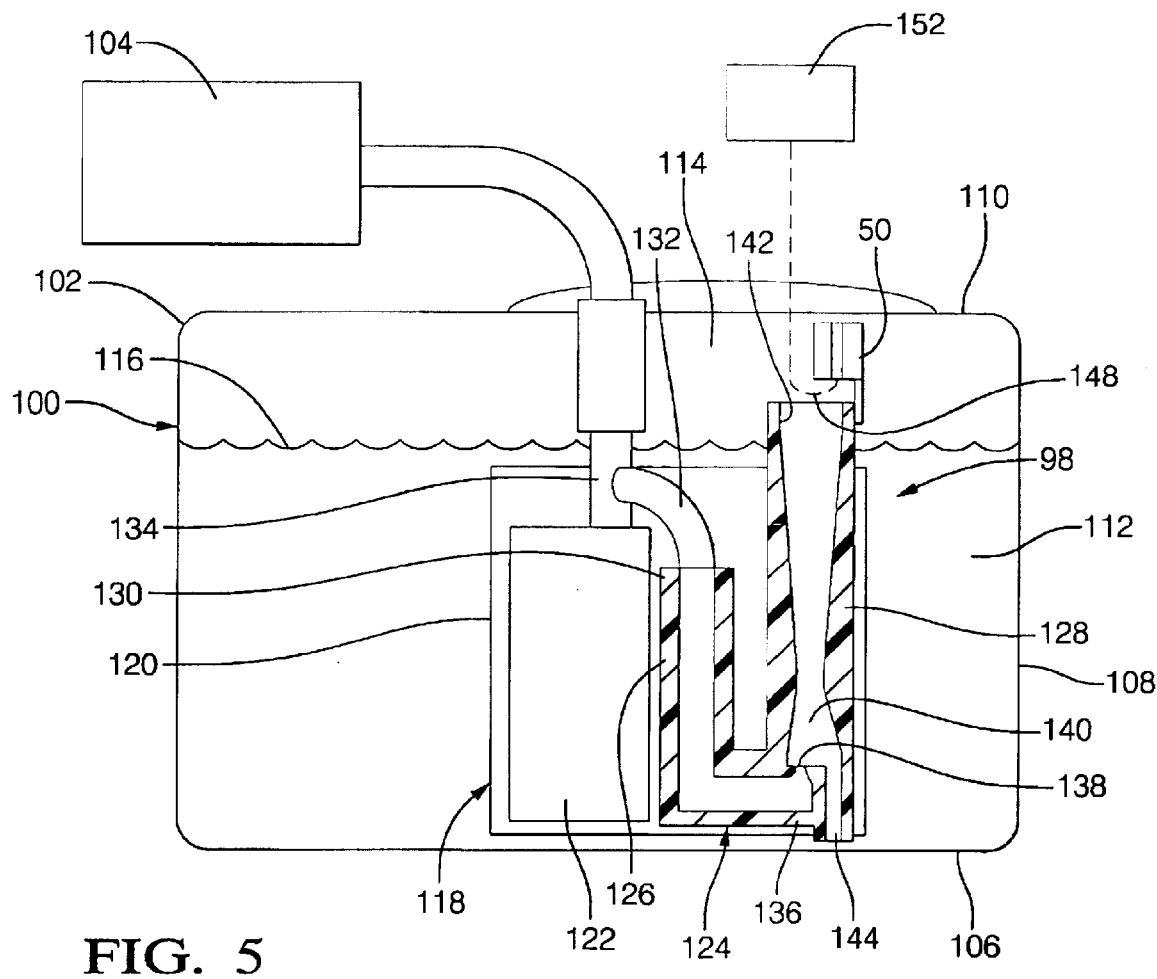
FIG. 5 is a simplified schematic with partial cross-sectional view of a fuel sensor system, fuel system and engine according to the present invention.

Referring to the drawings and in particular FIG. 5, one embodiment of a fuel sensor system 98, according to the present invention, is shown for a fuel system 100 of a vehicle (not shown). The fuel system 100 supplies fuel from a fuel tank 102 to an engine 104 of the vehicle. The fuel tank 102 is used to hold liquid fuel. In this embodiment, the fuel tank 102 includes a bottom or base wall 106 and a side wall 108 around a periphery of the base wall 106 and extending generally perpendicular thereto. The fuel tank 102 also includes a top wall 110 extending generally perpendicular to the side wall 108 to form an interior chamber 112. The fuel tank 102 also includes a vapor space 114 formed above a liquid fuel 116 in the fuel tank 102. The fuel tank 102 is made of a rigid material, preferably a plastic material. It should be appreciated that the fuel tank 102 could be made of a metal material such as steel. It should also be appreciated that the fuel tank 102 is conventional and known in the art.

The fuel sensor system 98 also includes a fuel delivery module 118 disposed in the fuel tank 102 to deliver fuel from the fuel tank 102. The fuel delivery module 118 includes a fuel reservoir 120 disposed in the interior chamber 112 of the fuel tank 102 and a fuel pump 122 disposed in the fuel reservoir 120 to pump fuel to the engine 104. The fuel pump 122 is electrically driven and connected to a source of power (not shown). The fuel pump 122 is sized by the cold start requirements of the fuel system 100. It should be appreciated that the fuel pump 122 is disposed in the fuel reservoir 120 and the fuel reservoir 120 maintains fuel at the fuel pump 122 under low fuel conditions. It should also be appreciated that the fuel reservoir 120 and fuel pump 122 are conventional and known in the art.

The fuel sensor system 98 also includes a jet pump 124 disposed in the fuel reservoir 120 of the fuel tank 102, and connected in fluid communication with the fuel pump 122. The jet pump 124 includes a venturi pump 126 and a standpipe 128 connected to the venturi pump 126. The venturi pump 126 is generally "L" shaped and has an upper end 130 fluidly connected by a conduit 132 to an outlet 134 of the fuel pump 122. The venturi pump 126 has a lower end 136 with an orifice 138 to pass fuel therethrough. The standpipe 128 extends vertically from the lower end 136 of the venturi pump 126 and has a chamber 140 at a lower end thereof adjacent the orifice 138. The standpipe 128 has an outlet 142 at an upper end thereof communicating with the chamber 140. The standpipe 128 also has an inlet 144 at a lower end thereof communicating with the chamber 140. The fuel reservoir 120 is kept full by the venturi pump 126, which passes a small amount of the high pressure fuel from the fuel pump 122 through the orifice 138 through which expands into the chamber 140, causing a pressure drop drawing fuel in from the inlet 144. The jet pump 124 is made of a rigid material such as plastic. The jet pump 124 is a monolithic structure being integral, unitary, and one-piece.

The fuel sensor system 98 further includes a sensor 50 disposed, preferably, in the vapor space 114 in the interior chamber 112 of the fuel tank 102. The sensor 50 can be of an interdigitated type. The sensor 50 is mounted above the outlet 142 of the standpipe 128 such that fuel exiting the standpipe 128 flows onto the sensor 50. The sensor 50 is positioned within a flow of liquid fuel while the fuel pump 122 is on. It should be appreciated that the sensor 50 senses a property of the fuel such as the volatility of the fuel It should also be appreciated that the sensor 50 can sense properties other than fuel volatility such as alcohol content.

The sensor 50 can be mounted to the standpipe 128. The sensor 50 is mounted by connecting wires 148, with the connecting wires 148 below the sensor 50, so that excess liquid can drain down the connecting wires 148 from the lowest point of the sensor 50 to allow the excess liquid fuel to drain away. The connecting wires 148 are attached to the standpipe 128 by at least one, and preferably a pair of plastic cable ties. The sensor 50 is mounted at least seven millimeters (mm) above the fuel level in the fuel tank 102. It should be appreciated that the sensor 50 needs to be mounted so that excess liquid on the outside can drain off, otherwise, the fuel remaining on the outside constitutes an uncontrolled volume. It should also be appreciated that the sensor 50 needs to be mounted above the fuel level, otherwise, fuel continuously replaces fuel being evaporated, producing a source of error.

The fuel sensor system 98 also includes an electronic controller 152 electrically connected to the sensor 50. The controller 152 receives and stores the value of the fuel property such as drivability index measured by the sensor 50 for use in a fuel algorithm to adjust an air-to-fuel ratio to the engine 104. It should be appreciated that the controller 152 can be a separate controller or some other controller in the vehicle.

In operation, liquid fuel in the interior chamber 112 of the fuel tank 102 is pumped by the fuel pump 122 through the fuel line into the engine 104. The sensor 50 is located in the vapor space 114 of the fuel tank 102, above the maximum fill level. The sensor 50 is positioned within a flow of liquid fuel while the fuel pump 122 is on. When the fuel pump 122 is on, the sensor 50 is in contact with fuel. A test is performed when the engine 104 is turned off, thus shutting off the fuel pump 122. The sensor 50 retains a fuel sample after the fuel pump 122 has been turned off by capillary action between plates of the sensor 50. Excess liquid drains down the wires 148 that are used for a support. The sensor 50 is heated by the controller 152 after the fuel pump 122 has been turned off to sense the volatility of the fuel After the fuel pump 122 is turned off, a predetermined time interval such as five seconds is sufficient before the beginning of the measurement. Capacitance of the sensor 50 is measured as a function of temperature of the sensor 50 as the fuel is heated. The presence of ethanol in the fuel and the fuel volatility are determined by the controller 152 from the measurements. It should be appreciated that the output of the jet pump 124 is used to deluge the sensor 50, mounted above the outlet of the standpipe 128 such that fuel exiting the standpipe 128 flows onto the sensor 50.

The sensor element contained an electrical heater used to raise the temperature of the fuel sample. A thermistor was used to measure the temperature of the fuel sample, and two metal electrodes were assembled to be electrically insulated from one another with a gap of about 0.2 millimeters (mm) between the electrodes.

The sensor element was located in the vapor dome of the fuel tank, so when the vehicle was at rest and sloshing of fuel in the tank had stopped, the sensor element was always in the vapor, above the maximum liquid level in the tank. While the engine was running, the sensor element was continually bathed in liquid fuel. Liquid fuel was retained between the two metal electrode plates of the sensor element by capillary action gap between the two metal electrodes. The fuel sample evaporated as the sensor element was heated.

Figure 6:
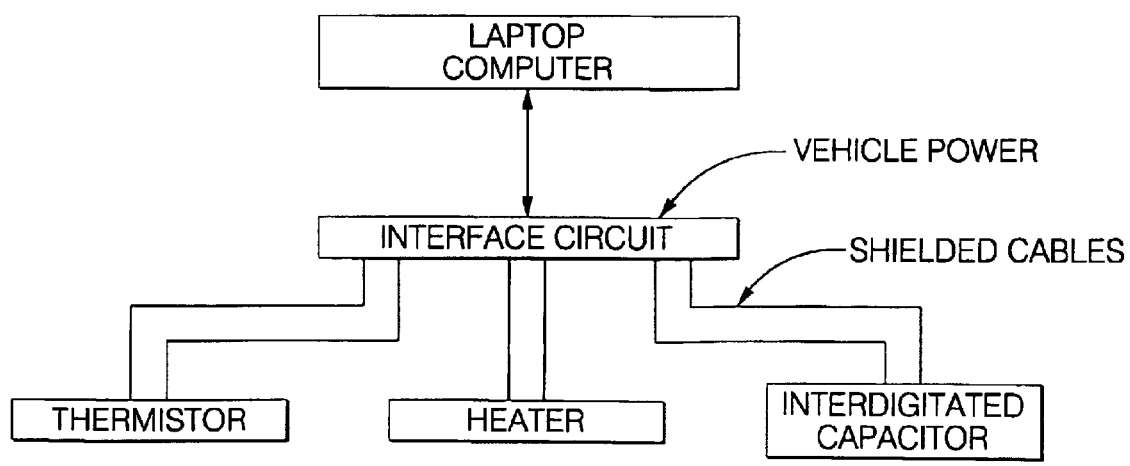
FIG. 6 is a simplified schematic diagram of a test system used for analysis of the present invention on-board a vehicle during a test procedure.

As shown in FIG. 6, an interface circuit was used. The interface circuit contained a microcontroller that could be programmed to calculate the approximation value or predicted value of DI for the fuel and provided an output to the engine controller for use during the next cold start. For this example, the interface circuit was controlled by a laptop computer. The interface circuit transferred data to the laptop. The data was used to determine the DI of the fuel.

The laptop could command the interface circuit to apply a constant voltage to the heater. For this example, the interface circuit was powered by the vehicle's electrical supply, and the heater voltage, when On, was set to about 8 V by a voltage regulator in the interface circuit. While the heater was on, at 1 second intervals, the interface circuit sent output to the laptop including (1) the resistance of the thermistor in the sensor element, and (2) the value of a capacitance response linearly related to the capacitance between the two electrodes. The laptop converted the measured thermistor resistance to an equivalent temperature.

To determine DI, the sensor element was bathed in fuel while the engine was on. After the engine had been turned off for 5 seconds, the laptop commanded the interface circuit to begin heating the sensor element. The values of the temperature of the sensor element and the capacitance response were transferred from the interface circuit to the laptop at 1 second intervals. These values were stored for subsequent use. When the capacitance response had dropped to a predetermined value, the interface circuit turned the heater Off, and data recording stopped. For the present example, the interface circuit was set up to stop heating when the capacitance response had dropped to about 0.67 Volts. If the sensor element began filled with gasoline that did not contain ethanol, this corresponds to about 22% of the initial sample volume.

Figure 7:
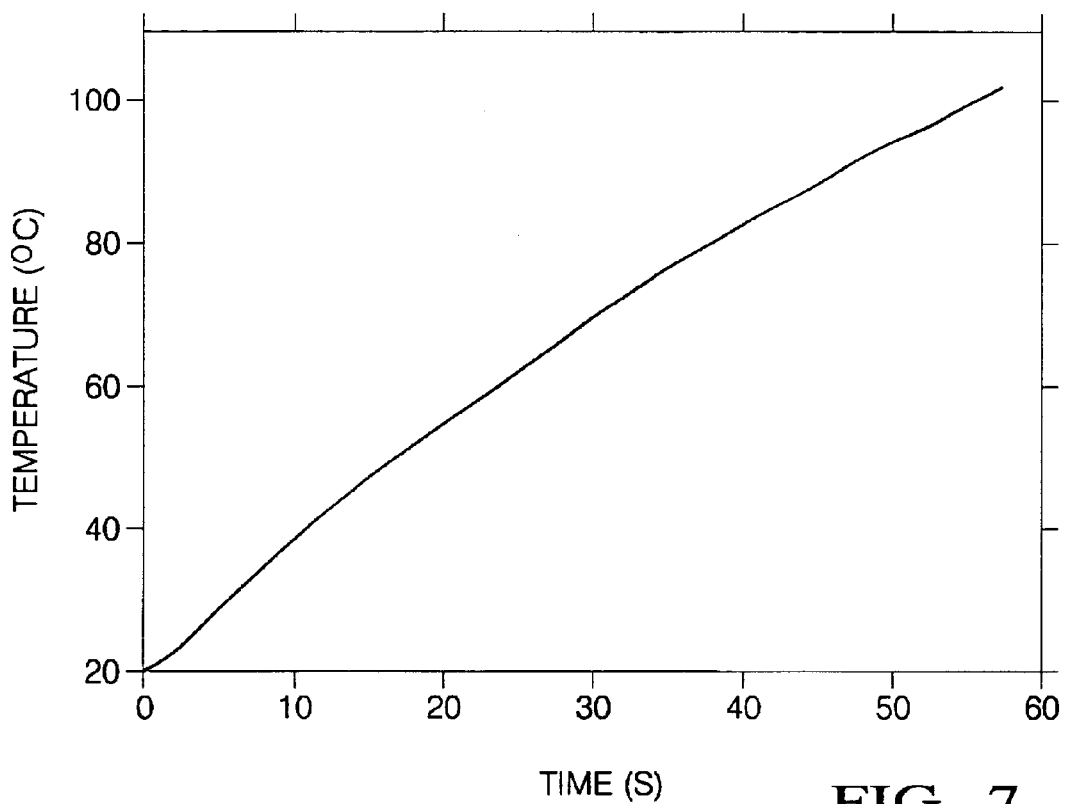
FIG. 7 is a graph of data collected during the test procedure corresponding to temperature in degrees Celsius (° C.) versus time in seconds.
Figure 8:
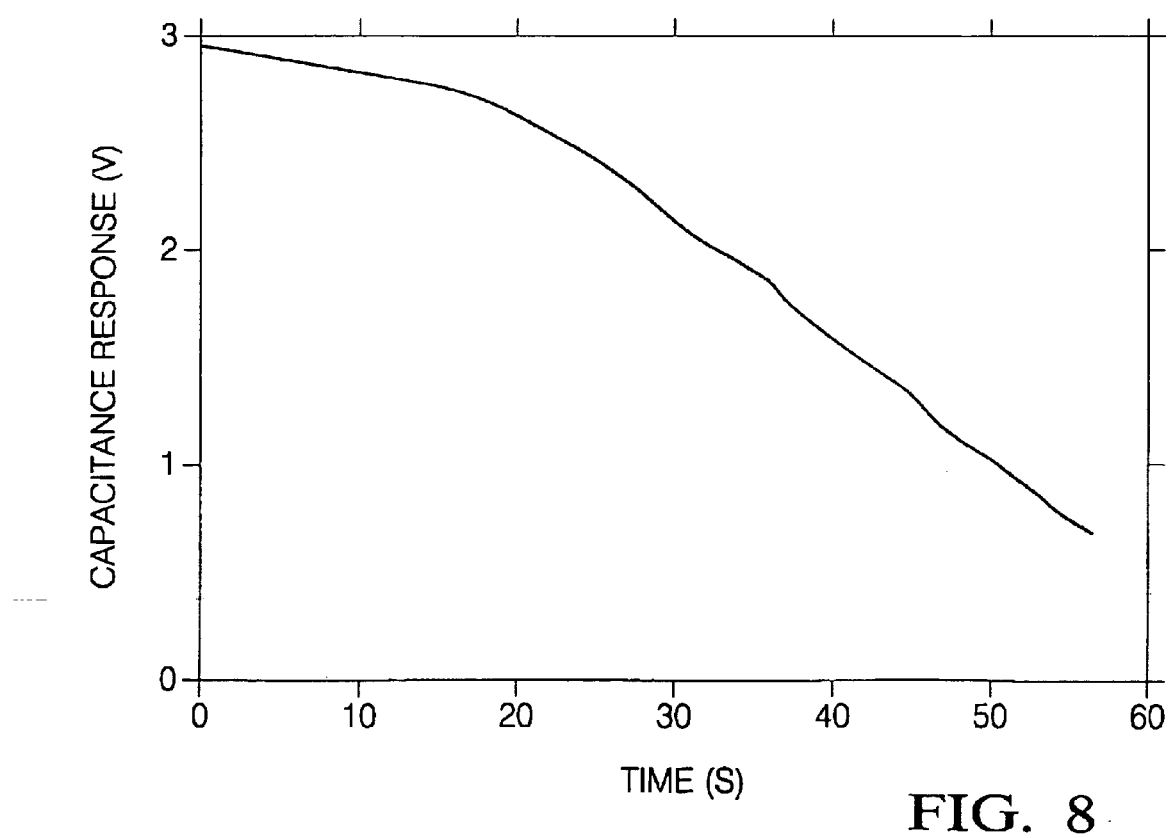
FIG. 8 is a graph of data collected during the test procedure corresponding to the output of a capacitance measuring circuit in volts versus time in seconds.

FIG. 7 shows an example of the data collected using the configuration described above corresponding to the measured temperature as a function of time. FIG. 8 shows an example of the data collected using the configuration described above corresponding to the measured capacitance response as a function of time. This data was used to determine the approximation value or predicted value of DI for the fuel sample.

The initial capacitance, measured after excess fuel has drained away from the sensor element, but before the heater had been turned On, was roughly proportional to the dielectric constant $\in$ of the fuel, or a good approximation of the value. For gasoline that did not contain an added oxygenate, $\in$ was typically 2.1.

Two different oxygenates have been commonly added to gasoline sold as fuel in the United States: ethanol and MTBE (methyl tertiary butyl ether). When ethanol was added, the concentration by volume in the fuel was typically between 9% and 10%. When MTBE was added, the concentration by volume was typically between 8% and 15%. Added oxygenate increased the actual DI of the fuel. The relationship between $\in$ of the fuel and the added DI from the oxygenate was approximately the same for both ethanol and MTBE. Consequently, the value of $\in$, measured at the time heating began, indicated the increment in DI due to added oxygenate in the fuel.

At dilute concentration in gasoline, the change $\Delta\in$ in the dielectric constant of oxygenate-gasoline mixtures caused by the addition of a small amount of oxygenate was proportional to both the concentration and to the dipole moment of the oxygenate $$\Delta\in \propto n\mu, \tag{7}$$

where n was the number of added oxygenate molecules per unit volume and $\mu$ was the dipole moment of the oxygenate molecule. The dipole moments of ethanol and MTBE were 1.7 and 1.2 Debye, respectively. The densities were 0.79 and 0.74 grams per milliliter (g/mL), respectively. The molecular weights were 46.07 and 88.15 grams per mole (g/mol). Thus if two gasoline samples were diluted by equal concentrations (by volume) of ethanol and MTBE, $\Delta\in$ was a factor of 2.9 larger for the sample that was diluted by ethanol than for the sample diluted with MTBE. However, the change in DI for a sample diluted to a small concentration by ethanol was larger than for a sample diluted to the same concentration (by volume) by MTBE by the factor 3.0. Thus to determine the change in DI caused by adding ethanol and MTBE to gasoline, only a measurement of $\Delta\in$ was needed. It was unnecessary to know whether $\Delta\in$ was caused by ethanol, MTBE, or both.

In particular, when a particular interdigitated cube sensor was filled with gasoline that did not contain oxygenate, the capacitance response $C_0$ was measured to be 2.8739. When the same interdigitated cube was filled with gasoline that contained 10% ethanol, $C_0$ was measured to be 4.8945. The addition of 10% ethanol by volume of ethanol to gasoline that does not contain oxygenate, increased DI of the fuel by 86.2. The effect of oxygenate concentration on DI was thus roughly linearly related to the capacitance measured at the time that heating began, or at least a good approximation. The proportionality constant for the effect of $C_0$ on measured DI for this interdigitated cube sensor was thus 86.2/(4.8945−2.8739)=42.7.

Two other quantities measured by the sensor were the temperature $T_0$ at the time heating first began and the time duration $t_{max}$ of heating the fuel sample before data collection stops. The temperature $T_0$ was approximately the ambient temperature in the fuel tank. It was uncontrolled in the measurement. While the engine was operated, the temperature of the fuel in the tank gradually rose. It was believed that the initial temperature of the fuel sample about to be heated had an effect on the evaporation of the fuel sample. It was also believed that the time duration $t_{max}$ required for a predetermined fraction of the fuel to be evaporated was an indication of DI, since a high volatility fuel could be expected to evaporate more rapidly than a low volatility fuel. The output from the sensor was used to predict DI through an equation of the form $$DI = A_0 + A_1 C_0 + A_2 T_0 + A_3 t_{max} \tag{8}$$

Figure 9:
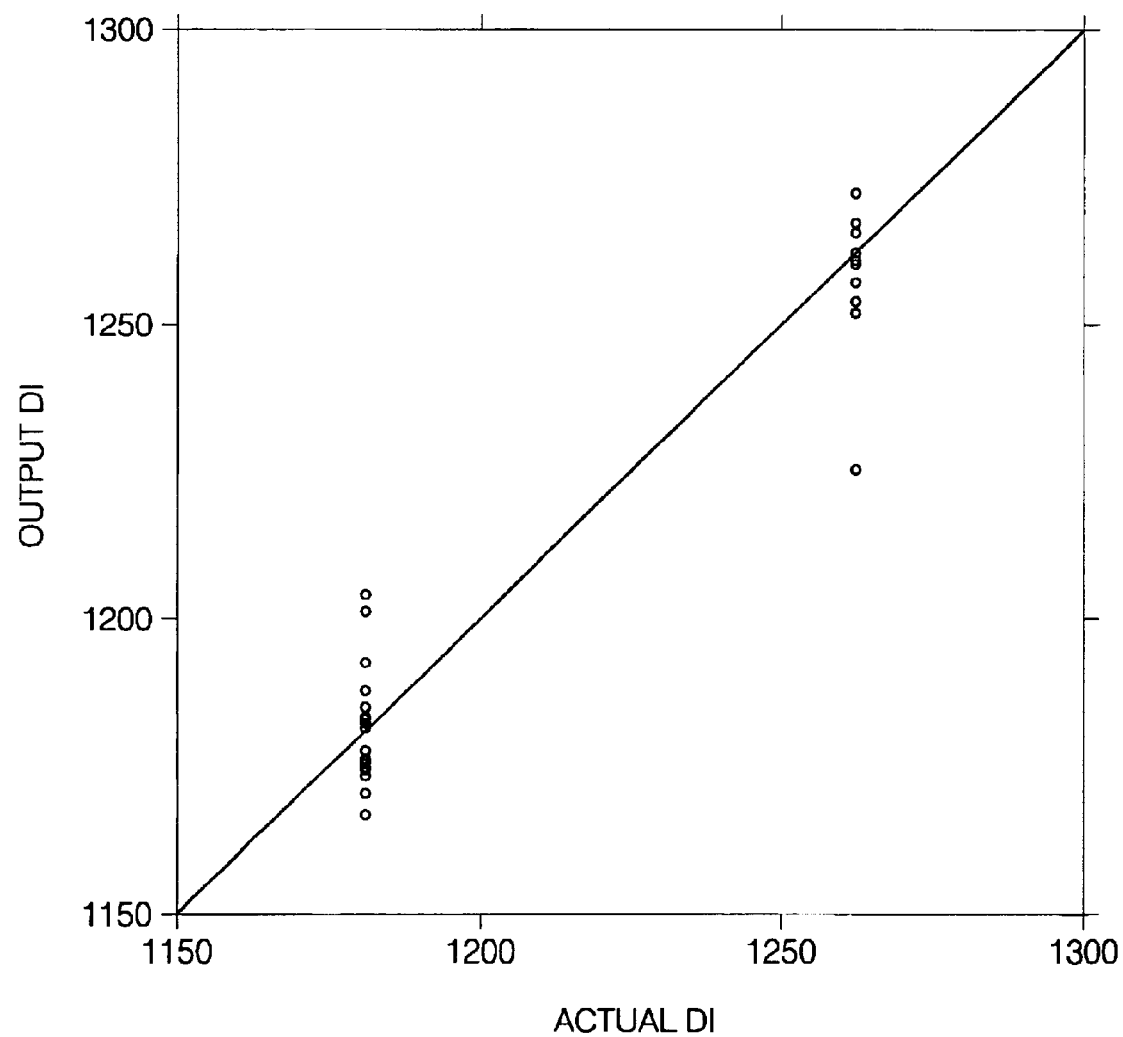
FIG. 9 is a graph of data collected during the test procedure corresponding to approximation value or output value of DI versus actual value of DI.

From the above discussion, $A_1 = 42.7$ for this particular sensor. The values of $A_0$, $A_2$, and $A_3$ were determined by fitting to data measured with two different types of gasoline, and with a sequence of ambient temperatures in the fuel tank. The measured values of DI, $C_0$, $T_0$, and $t_{max}$ are given in Table I. The best fit was found using a linear model fitting routine. For the best fit: $A_0 = 267.219$, $A_2 = 3.562298$, and $A_3 = 12.28896$. The residual standard error for the fit was 10.95. The residual standard error was the standard deviation of the difference between actual DI and predicted DI. The actual DI was compared with the fitted DI in FIG. 9. The actual DI was determined by collecting a fuel sample before first measurement and after the last measurement with each type of fuel. The fuel samples were sent to a commercial laboratory to perform the ASTM D 86 test.

TABLE I

An interdigitated DI sensor installed in a Grand Am was used with two different types of fuel and with a sequence of initial temperatures. Also given is the predicted DI from Eq. (8) and the difference between the predicted and actual DI.

| Actual DI | $T_0$ [° C.] | $C_0$ | $t_{max}$ [s] | Predicted DI | Pred − Act |
|---|---|---|---|---|---|
| 1181 | 6.702 | 3.00147 | 63 | 1193 | 12 |
| 1181 | 7.219 | 3.01026 | 62 | 1183 | 2 |
| 1181 | 9.193 | 2.99609 | 63 | 1202 | 21 |
| 1181 | 10.636 | 2.98729 | 61 | 1182 | 1 |
| 1181 | 12.257 | 2.99267 | 61 | 1188 | 7 |
| 1181 | 14.258 | 2.98192 | 60 | 1183 | 2 |
| 1181 | 16.504 | 2.96921 | 59 | 1178 | −3 |
| 1181 | 18.642 | 2.97410 | 58 | 1173 | −8 |
| 1181 | 20.970 | 2.96432 | 58 | 1181 | 0 |
| 1181 | 23.203 | 2.95699 | 57 | 1177 | −4 |
| 1181 | 25.286 | 2.93304 | 56 | 1171 | −10 |
| 1181 | 27.777 | 2.93451 | 55 | 1167 | −14 |
| 1181 | 30.064 | 2.92718 | 55 | 1175 | −6 |
| 1181 | 31.957 | 2.89443 | 56 | 1193 | 12 |
| 1181 | 34.053 | 2.89345 | 54 | 1176 | −5 |
| 1181 | 36.027 | 2.90323 | 54 | 1183 | 2 |
| 1181 | 37.716 | 2.88856 | 53 | 1176 | −5 |
| 1181 | 39.485 | 2.88759 | 53 | 1182 | 1 |
| 1181 | 41.106 | 2.87830 | 53 | 1188 | 7 |
| 1181 | 42.617 | 2.86999 | 54 | 1205 | 24 |
| 1181 | 43.869 | 2.86755 | 52 | 1185 | 4 |
| 1181 | 45.054 | 2.84946 | 52 | 1188 | 7 |
| 1262 | 22.440 | 3.02053 | 61 | 1226 | −36 |
| 1262 | 22.876 | 3.04985 | 64 | 1265 | 3 |
| 1262 | 25.422 | 3.03910 | 63 | 1262 | 0 |
| 1262 | 27.913 | 3.01075 | 62 | 1257 | −5 |
| 1262 | 30.091 | 3.00587 | 61 | 1252 | −10 |
| 1262 | 32.311 | 2.99853 | 62 | 1272 | 10 |
| 1262 | 34.285 | 2.98192 | 60 | 1254 | −8 |
| 1262 | 36.340 | 2.97165 | 60 | 1261 | −1 |
| 1262 | 38.260 | 2.96188 | 60 | 1267 | 5 |
| 1262 | 39.730 | 2.94428 | 60 | 1272 | 10 |
| 1262 | 41.391 | 2.94037 | 58 | 1253 | −9 |
| 1262 | 42.916 | 2.92327 | 58 | 1258 | −5 |
| 1262 | 43.679 | 2.92375 | 58 | 1260 | −2 |

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

In the claims:

1. A method for adjusting a delivery rate of fuel to an internal combustion engine of a motor vehicle during subsequent start up cycles comprising the steps of:
measuring at least one characteristic of fuel (14) corresponding to a temperature of the fuel, a volume of the fuel, and a concentration of oxygenates within the fuel; and
determining an approximation of a measure of the volatility of the fuel (18, 20, 22, 24, 26, 28, 30) as a function of at least one of the measured characteristics corresponding to the temperature, volume, and concentration of oxygenates of the fuel, wherein a delivery rate of fuel to the internal combustion engine to be controlled is adjusted during a subsequent start up cycle based on the approximation of the measure of the volatility of the fuel on-board the vehicle.

2. The method of claim 1 further comprising the step of:
collecting a sample volume of fuel on-board the motor vehicle in association with operation of a fuel distribution system.

3. The method of claim 2 further comprising the step of:
heating the collected sample volume of fuel to evaporate the collected sample volume down to a predetermined volume X, where X is a percentage of the collected sample volume in the range of 50% or more.

4. The method of claim 3 further comprising the step of:
measuring a characteristic corresponding to a temperature of the fuel during heating of the collected sample volume of fuel to be evaporated to the predetermined volume X.

5. The method of claim 3 further comprising the step of:
measuring the characteristic of the fuel corresponding to volume of the fuel during heating of the collected sample volume of fuel to be distilled to the predetermined volume X.

6. The method of claim 3 further comprising the step of:
measuring a characteristic of the fuel corresponding to a duration of time required to evaporate the collected sample volume of fuel down to the predetermined volume X based on the measured characteristic corresponding to volume of the sample of fuel.

7. The method of claim 1 wherein the measure of the volatility of the fuel is driveability index.

8. The method of claim 1 wherein the characteristic measured corresponding to temperature is resistance.

9. The method of claim 1 wherein the characteristic measured corresponding to volume is capacitance.

10. The method of claim 1 wherein the characteristic measured corresponding to volume is resistance.

11. The method of claim 1 wherein the characteristic measured corresponding to concentration of oxygenates is capacitance.

12. The method of claim 1 wherein the characteristic measured corresponding to concentration of oxygenates is resistance.

13. The method of claim 1 further comprising the step of:
measuring a characteristic that varies monotonically with the sample volume during evaporation.

14. The method of claim 1, wherein the approximation of the measure of fuel volatility is a linear function.

15. A method for adjusting a delivery rate of fuel to an internal combustion engine of a motor vehicle during subsequent start up cycles comprising the steps of:
collecting a sample volume of fuel (10) on-board the motor vehicle in association with operation of a fuel distribution system;
heating the collected sample volume of fuel (12) to evaporate the collected sample volume down to a predetermined volume X, where X is a percentage of the collected sample volume in the range of 50% or more;
measuring at least one characteristic of fuel (14) corresponding to temperature of the fuel during heating of the collected sample volume of fuel to be evaporated to the predetermined volume X and corresponding to volume of the fuel during heating of the collected sample volume of fuel to be evaporated to the predetermined volume X;
measuring a characteristic of the fuel (16) corresponding to a concentration of oxygenates within the fuel; and
determining an approximation of a measure of fuel volatility of the fuel (18, 20, 26, 28, 30) as a function of at least one of the measured characteristics corresponding to the temperature, volume, and concentration of oxygenates of the fuel, wherein a delivery rate of fuel to the internal combustion engine to be controlled is adjusted during a subsequent start up cycle based on the at least one measured characteristic of the fuel on-board the vehicle.

16. The method of claim 15 further comprising the steps of:
measuring a characteristic of the fuel as a function of time; and
identifying whether the sample volume of fuel contains ethanol based on the measured characteristic.

17. The method of claim 16, wherein the measured characteristic is capacitance and corresponds to a dielectric constant of the fuel, and wherein the sample volume of fuel contains ethanol if the measured characteristic corresponds to a dielectric constant approximately greater than 3.

18. The method of claim 16, wherein the measured characteristic is resistance and corresponds to conductivity of the fuel, and wherein the sample volume of fuel contains ethanol if the measured characteristic is higher than a predetermined value.

19. The method of claim 15, wherein the temperature measuring step further comprises the steps of:
measuring a temperature $T_A$ when approximately 10% of the sample volume has been evaporated; and
measuring a temperature $T_B$ when approximately 50% of the sample volume has been evaporated; and
using a previously determined correlation to estimate from $T_A$ and $T_B$ the corresponding temperatures $T_{10}$ and $T_{50}$ at which a sample of the same fuel would have been 10% and 50%, respectively, evaporated in the ASTM D 86 laboratory test.

20. The method of claim 19, wherein the determining step further comprises the step of:
determining if a value equal to $((T_{50}-T_{10})/T_{50})$ is greater than 0.425;
if the value is greater than 0.425, identifying the sample volume of fuel as a winter fuel blend; and
if the value is not greater than 0.425, identifying the sample volume of fuel as a summer fuel blend.

21. The method of claim 15 further comprising the step of:
storing the approximation of the measure of the volatility of the fuel in memory for adjusting fuel delivery to the internal combustion engine to be controlled prior to a subsequent start up cycle.

22. An on-board system for adjusting a delivery rate of fuel to an internal combustion engine of a motor vehicle during subsequent start up cycles comprising:
  means for measuring (44) at least one characteristic corresponding to a temperature of the fuel, a volume of the fuel, and a concentration of oxygenates within the fuel; and
  means for determining (40) an approximation of a measure of the volatility of the fuel as a function of the at least one measured characteristic corresponding to the temperature, volume, and the concentration of oxygenates within the fuel, wherein a delivery rate of fuel to the internal combustion engine to be controlled is adjusted during a subsequent start up cycle based on the approximation of the measure of the volatility of the fuel on-board the vehicle.

23. The system of claim 22 further comprising:
  means for collecting a sample volume of fuel on-board the motor vehicle in association with operation of a fuel distribution system.

24. The system of claim 23 further comprising:
  means for heating the collected sample volume of fuel to evaporate the collected sample volume down to a predetermined volume X, where X is a percentage of the collected sample volume in the range of 50% or more.

25. The system of claim 24 further comprising:
  means for measuring a characteristic corresponding to a temperature of the fuel during heating of the collected sample volume of fuel to be evaporated to the predetermined volume X.

26. The system of claim 24 further comprising:
  means for measuring the characteristic of the fuel corresponding to volume of the fuel during heating of the collected sample volume of fuel to be evaporated to the predetermined volume X.

27. The system of claim 24 further comprising:
  means for measuring a characteristic of the fuel corresponding to a duration of time required to evaporate the collected sample volume of fuel down to the predetermined volume X based on the measured characteristic corresponding to volume of the sample of fuel.

28. The system of claim 22 wherein the measure of the volatility of the fuel is driveability index.

29. The system of claim 22 wherein the characteristic measured corresponding to temperature is resistance.

30. The system of claim 22 wherein the characteristic measured corresponding to volume is capacitance.

31. The system of claim 22 wherein the characteristic measured corresponding to volume is resistance.

32. The system of claim 22 wherein the characteristic measured corresponding to concentration of oxygenates is capacitance.

33. The system of claim 22 wherein the characteristic measured corresponding to concentration of oxygenates is resistance.

34. The system of claim 22 further comprising:
  means for measuring a characteristic that varies monotonically with the sample volume during evaporation.

35. The system of claim 22, wherein the approximation of the measure of the volatility of the fuel is a linear function.

36. An on-board system for adjusting a delivery rate of fuel to an internal combustion engine of a motor vehicle during subsequent startup cycles comprising:
  means for collecting (46) a sample volume of fuel on-board the motor vehicle in association with operation of a fuel distribution system;
  means for heating (80) the collected sample volume of fuel to evaporate the collected sample volume down to a predetermined volume X, where X is a percentage of the collected sample volume in the range of 50% or more;
  means for measuring (83) at least one characteristic corresponding to temperature of the fuel during heating of the collected sample volume of fuel to be evaporated to the predetermined volume X and the volume of the fuel during heating of the collected sample volume of fuel to be evaporated to the predetermined volume X;
  means for measuring (50) a characteristic corresponding to a concentration of oxygenates within the fuel; and
  means for determining (40) an approximation of a measure of the volatility of the fuel as a function of the measured characteristics corresponding to the temperature and the concentration of oxygenates of the fuel, wherein a delivery rate of fuel to the internal combustion engine to be controlled is adjusted during a subsequent start up cycle based on the measured characteristics of the fuel on-board the vehicle.

37. The system of claim 36 further comprising: means for measuring a characteristic of the fuel as a function of time; and
  means for identifying whether the sample volume of fuel contains ethanol based on the measured characteristic.

38. The system of claim 36 wherein the measure of the volatility of the fuel is driveability index.

39. The system of claim 37, wherein the measured characteristic is capacitance and corresponds to a dielectric constant of the fuel, and wherein the sample volume of fuel contains ethanol if the measured characteristic corresponds to a dielectric constant approximately greater than 3.

40. The system of claim 37, wherein the measured characteristic is resistance and corresponds to conductivity of the fuel, and wherein the sample volume of fuel contains ethanol if the measured characteristic is higher than a predetermined value.

41. The system of claim 36, wherein the temperature measuring means further comprises:
  means for measuring a temperature $T_A$ when approximately 10% of the sample volume has been evaporated; and
  means for measuring a temperature $T_B$ when approximately 50%, of the sample volume has been evaporated; and
  means to determine from $T_A$ and $T_B$ the corresponding temperatures $T_{10}$ and $T_{50}$ at which a sample of the same fuel would have been 10% and 50%, respectively, evaporated in the ASTM D 86 laboratory test.

42. The system of claim 41, wherein the determining means further comprises:
  means for determining if a value equal to $((T_{50}-T_{10})/T_{50})$ is greater than 0.425;
  if the value is greater than 0.425, means for identifying the sample volume of fuel as a winter fuel blend; and
  if the value is not greater than 0.425, means for identifying the sample volume of fuel as a summer fuel blend.

43. The system of claim 36 further comprising:
  means for storing the approximation of the measure of the volatility of the fuel in memory for adjusting fuel delivery to the internal combustion engine to be controlled prior to a subsequent start up cycle.

* * * * *